United States Patent [19]

Layotte et al.

[11] 4,271,923
[45] Jun. 9, 1981

[54] MOBIL DEVICE FOR GENERATING ACOUSTIC SHEAR WAVES IN THE EARTH

[75] Inventors: Pierre-Claude Layotte, Les Mathes; André James, Royan, both of France

[73] Assignee: Institut Francais du Petrole, Rueil-Malmaison, France

[21] Appl. No.: 55,095

[22] Filed: Jul. 5, 1979

[30] Foreign Application Priority Data

Jul. 5, 1978 [FR] France ............................... 78 20008

[51] Int. Cl.³ ...................... G01V 1/047; G01V 1/053
[52] U.S. Cl. ..................................... 181/114; 181/121; 180/24.02; 280/80 B
[58] Field of Search .................. 181/114, 121; 367/75; 280/80 B, 80 R, 638, 656; 180/24.02

[56] References Cited

U.S. PATENT DOCUMENTS

| | | | |
|---|---|---|---|
| 1,314,498 | 9/1919 | Bower | 280/80 B |
| 2,717,707 | 9/1955 | Martin | 280/80 B |
| 2,910,134 | 10/1959 | Crawford et al. | 181/121 |
| 3,181,914 | 5/1965 | Humes | 280/80 B |
| 4,050,540 | 9/1977 | Cholet et al. | 181/121 |
| 4,050,739 | 9/1977 | Toyooka | 280/80 B |
| 4,118,994 | 10/1978 | Layotte et al. | 181/121 |

FOREIGN PATENT DOCUMENTS

1049062 12/1975 Canada .................................. 280/80 B
826932 1/1960 United Kingdom ..................... 181/118

Primary Examiner—Nelson Moskowitz
Attorney, Agent, or Firm—Millen & White

[57] ABSTRACT

A mobile device for generating acoustic shear waves comprises a structure provided with at least one axle with wheels mounted thereon, said axle being displaceable with respect to at least a part of the structure.

The mobile device has mounted thereon a target-member displaceable from a position suitable for transportation to a working position where it is in contact with the earth, and means for striking the target member, when in working position, by means of a mass, to produce an impact thereon.

The target member is provided at its upper part with tracks for the wheels of the axle so that the wheels can be driven, by displacing the respective axles, from a position of contact with the earth to a position where they bear on the target member with the weight of at least a part of the structure.

10 Claims, 4 Drawing Figures

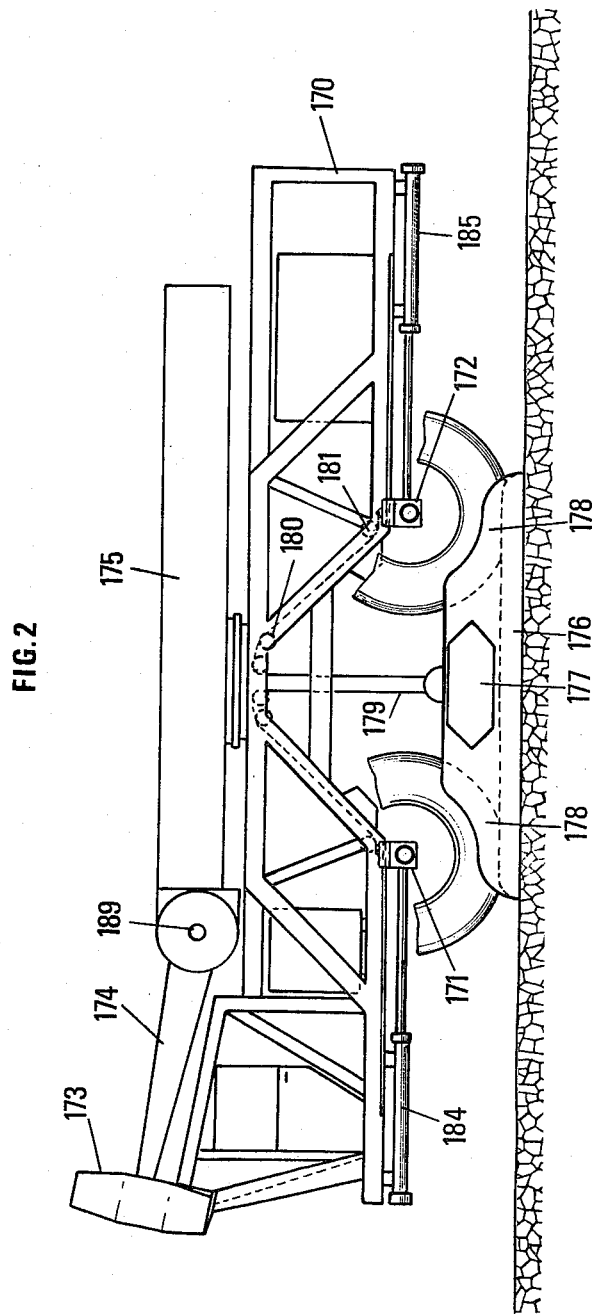

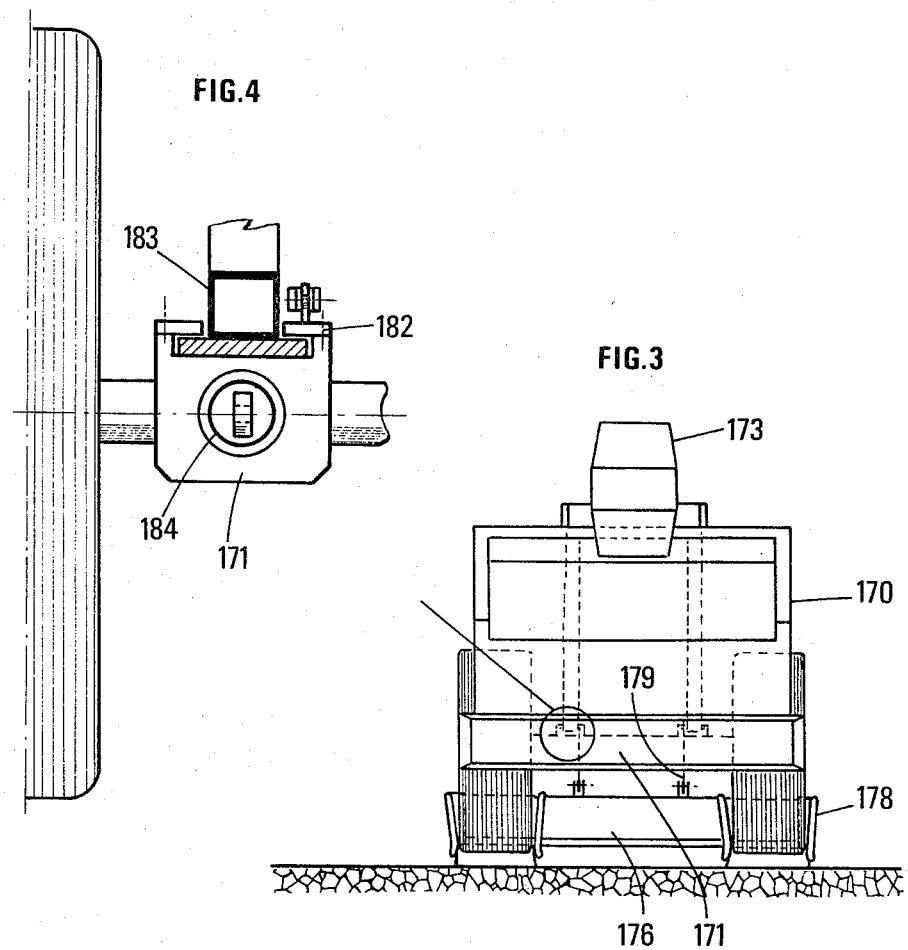

MOBIL DEVICE FOR GENERATING ACOUSTIC SHEAR WAVES IN THE EARTH

BACKGROUND OF THE INVENTION

The present invention relates to a mobile device for generating acoustic shear waves. More particularly the invention relates to a device for generating acoustic shear waves for land seismic prospecting operations.

A prior art device adapted to generate acoustic shear waves is known which comprises essentially a target-member provided with a coupling surface for coupling the device to the earth and a mass for striking the target-member along a direction substantially parallel to the surface of the earth. The mass is connected to a means for imparting thereto a velocity of predetermined amplitude having a component parallel to the coupling surface and whose direction is adjustable with respect to the target-member. Such means comprises, for example, an arm supporting the mass at one of its ends and adapted to pivot at its opposite end with respect to the frame of a carrying vehicle, upon actuation by motor means.

The target-member is suspended from articulated arms on the carrying vehicle and adapted to be vertically displaced from a transportation position to a working position where it is in contact with the earth.

According to an alternative embodiment of the prior art device, the target-member is provided with tracks for the rear wheels of the carrying vehicle. When it is desired to couple the target-member with the earth, the target-member is laid down on the earth at the selected location and it is disconnected from the articulated arms which support it in transportation position. Then the vehicle is moved so that its rear part, consisting in this case of two axles and the wheels mounted thereon, is placed on the target-member and maintained fixed in this position. The mass is then released and strikes the target-member with enhanced efficiency, as far as the seismic energy transmitted to the earth is concerned, because the rear part of the vehicle bears on the tracks.

Such a device has however the disadvantage that each "shot" must be preceded with moving of the vehicle for coupling the target-member with the earth, thereby limiting the maximum repeating frequency of the successive impacts.

SUMMARY OF THE INVENTION

The device of the invention overcomes the above-mentioned disadvantages by providing means for automatically laying down the target-member and coupling it to the earth.

The device of the present invention is remarkable in that both the mass and the means for imparting thereto a velocity of determined amplitude are attached to a structure provided with at least one axle with wheels mounted thereon, which axle can be displaced with respect to at least one portion of the structure. The structure also comprises a driving means adapted to displace said axle from a first position where the wheels rest on the earth to a second position where they bear on the target-member when the latter is coupled with the earth.

The device advantageously comprises a means for concurrently displacing the target-member and the axle from a first position to a second position where the axle and its wheels bear on the target-member. Such means consist for example of connection means between the axle and the target-member cooperating with driving means. The term "concurrently displacing the target member and the axle", as used in this specification and in the appended claims, designates the displacement of the target-member at such a rate that it comes into contact with the earth prior to the time each displaceable axle is displaced to a position in which it bears on the target member.

BRIEF DESCRIPTION OF THE DRAWINGS

Other features and advantages of the invention will be made apparent from the following description of a non-limitative embodiment thereof, given with reference to the accompanying drawings, wherein:

FIG. 2 shows the mobile device in a position where the target-member is in contact with the earth and the two wheels in close relation, bearing on the target-member;

FIG. 3 shows a side view of the mobile device bearing on the target-member, and, FIG. 4 is a partial detail view of the device of FIG. 3.

DETAILED DESCRIPTION

Figure 1:
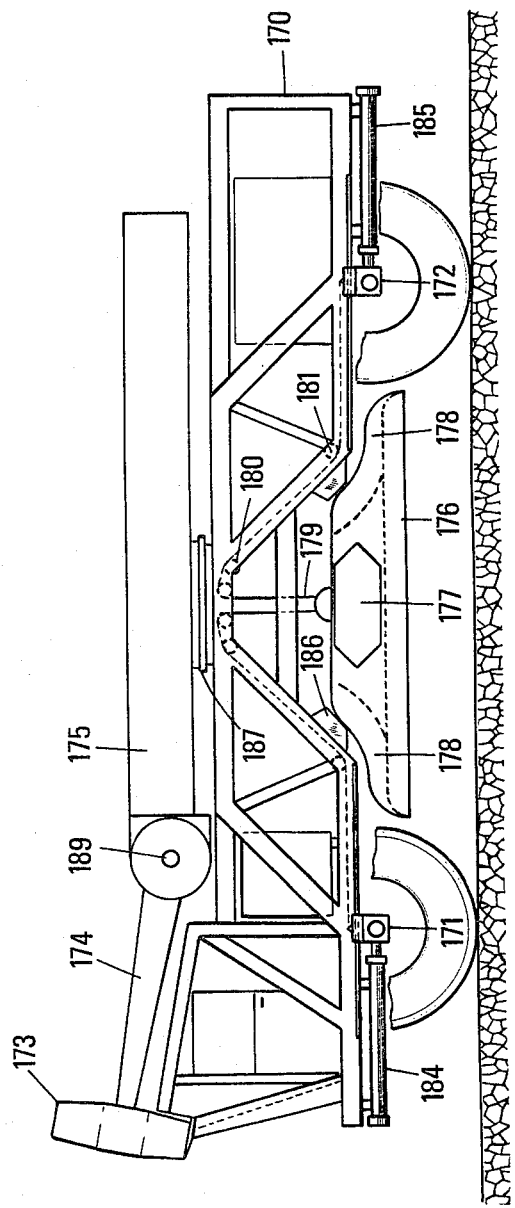
FIG. 1 shows the mobile device, the target-member being in upper position and the two axles in spaced apart position.

The device comprises (FIGS. 1 to 4) a structure 170 resting on two axles 171, 172, provided with wheels. The structure 170 carries the mass 173 and the means for imparting thereto a velocity of determined amplitude. These means consist, in the selected example, of a handling arm 174, one end of which is secured to the mass and the opposite end adapted to pivot about an axis 189 secured to a platform 175, in a plane perpendicular to the rigid structure 170.

The platform 175 is adapted to pivot on a turret 187 fixed to the structure 170, the rotation axis being perpendicular to the latter. The driving means rotating the arm 174 and platform 175 are not shown.

The device further comprises a target-member 176, provided on its side walls with striking surfaces 177 and at its upper part with tracks 178 for the wheels of the axles on which lies the structure 170.

The tracks 178 are so profiled that the wheels can easily mount the target-member 176.

Connecting means, consisting of cables or chains 179, for example, are secured to the upper part of the target-member 176 and pass over return pulleys 180 and 181 whose axes are respectively secured to the upper portion of the rigid structure 170, vertically above the target-member, and to the lower portion thereof, substantially at the level of the two axles 171, 172. The latter comprise anchoring points for the other end of the cables or chains 179. Each axle comprises two guiding slides 182 (FIGS. 3 and 4) on both sides of the longitudinal axis of the structure 170; they are adapted to slide on two guiding rails 183 fixed to the lower portion of the structure 170, parallel to its longitudinal axis.

The driving means adapted to displace the axles comprise two jacks 184, 185 whose bodies are fixed to the structure 170 and whose rods are fixed to the two axles 171 and 172. The two jacks are so oriented that their simultaneous expansion has the effect of bringing the two axles in a position of closeness and of lowering the target-member. Pressure means arranged on the structure 170, and not shown, are used to energize the two jacks. The target-member abuts, in its raised position, against stop-members 186 secured to the structure.

The spacing between the two axles in their position of closeness is selected shorter than the length of the target-member. Similarly, the maximum spacing between the two axles, corresponding to the retracted positions of the jack rods, is selected longer than the length of the target-member 176. In addition, the length of the cables or chains 179 is so selected that the spacing between the axles is greater than the length of the target-member when a traction force begins to be exerted thereon.

Once the device has been moved to the selected location for a "seismic shot" (FIG. 1), the two jacks 184, 185 are actuated to bring the two axles 171, 172 closer to each other and concurrently lower the targer-member 176; the latter thus comes in contact with the earth. As the pressure force exerted by the jacks continues to apply to the axles, the wheels mount the tracks 178 (FIG. 2) and press with the weight of the structure 170 on the target-member 176. The device is then ready for proceeding to the "shots".

The transfer of the device from a "shot" location to another is very easy. The rods of the jacks 184 and 185, are actuated to a retracted position so as to move apart the two axles 171, 172 and to lower the wheels onto the earth. The furthering of the retraction of the jack rods has the effect of exerting a tensile strength on cables or chains 179 which is transferred to the target-member 176. Accordingly, the latter is lifted up to its raised position where it comes in abutment against stop-members 186 (FIG. 1). The mobile structure 170 is ready for transportation.

It is within the scope of the invention to replace the two jacks by any other driving means adapted to drive the front and rear wheels in opposite directions. There can be used a hydraulic motor associated with a hydrostatic transmission of known type. When the device is in transportation position, the two axles 171, 172, are then blocked in position with respect to the structure 170 and the wheels are driven in the same direction of rotation. To cause the wheels to mount the tracks of the target-member, the axles are disconnected from the rigid structure and the hydraulic transmission applied to the wheels of the front axle 171, for example, is reversed. By actuating the hydraulic motor, the two axles are brought closer to each other and the wheels are caused to mount the target-member. Similarly, by reversing the direction of the transmission, the two axles would be brought back to their initial locking position after each "shot". It would also be within the scope of the invention to make use of a device provided with two axles only one of which can be displaced to mount the target-member, a part of the weight of the structure 170 being applied thereto.

Similarly, it would be possible to move one or both axles on the one hand, and the target-member on the other hand, independently from one another, by actuating their displacement through independent driving means.

In the above-described alternative embodiments, the structure is rigid and the axles are displaceable with respect thereto. It would not be outside the scope of the invention to substitute for the rigid structure 170 a deformable structure to which one or both axles are secured. As a non-limitative example, these structures could be in the form of two parts, each supporting one of the axles, said parts being displaceable with respect to each other.

Furthermore, the structure may be towed by a separate vehicle or may be self-propelling. In the latter case, the driving means for moving the vehicle may be independent from the driving means for displacing the axles and the target-member (this is the case when using jacks 184, 185) or may be identical (this is the case where the wheels are directly actuated by a hydraulic transmission, for example, to cause them to mount the target-member 176).

We claim:

1. In a mobile device for generating acoustic shear waves in the earth, comprising: a target-member having a coupling surface adapted for coupling the target-member with the earth and having tracks thereon adapted to receive wheels; a mass for striking the target-member and means for imparting to the mass a velocity of a determined amplitude having a component parallel to the coupling surface; and a vehicle adapted to support and transport the target-member, the mass and the velocity imparting means, and having at least one axle with wheels thereon, the improvement which comprises: positioning means for displacing the target-member between a raised transportation position and a lowered operational position wherein the coupling surface is in contact with the earth; and driving means for displacing said at least one axle between a first transportation position wherein its wheels are in contact with the earth and remote from the target-member and a second operational position wherein the wheels mount the lowered target-member and are received by the tracks thereon;

whereby said displacement of the axle can be effected while the vehicle is stationary, and said wheels bear down upon said target-member with at least a part of the weight of said vehicle when the target-member and the axle are both in their respective operational positions.

2. A device according to claim 1, which further comprises guide means for guiding the displacement of said at least one axle.

3. A device according to claim 1, wherein said driving means adapted to displace said at least one axle, comprises at least one hydraulic jack.

4. A device according to claim 1, wherein said driving means adapted to displace said at least one axle comprises a motor for controllably rotating said wheels of said at least one axle in either of two opposite directions of rotation.

5. A device according to claim 1, wherein said positioning means and said driving means cooperate to concurrently displace the target-member and the axle from their respective first transportation positions to their respective second operational positions.

6. A device according to claim 5, which further comprises connecting means for connecting said at least one axle to said target-member through at least one pulley, whereby the displacement of said at least one axle by said driving means causes concurrent displacement of said target-member.

7. A device according to claim 1, wherein said vehicle further comprises a driving motor, whereby the vehicle is rendered self-propelled.

8. A device according to claim 7, wherein said driving motor cooperates with transmission means adapted to controllably rotate the wheels of said at least one axle in either of two opposite directions of rotation.

9. A device according to claim 1, wherein said vehicle comprises two axles, one on either side of said target-member, said axles being movable in opposite directions from a first transportation position where their wheels are in contact with the earth on both sides of the target-member and a second operational position where their wheels press on the target-member when the latter is in contact with the earth.

10. A device according to claim 1, wherein said vehicle comprises at least one displaceable part to which is secured said at least one axle.

* * * * *